(12) United States Patent
Wu et al.

(10) Patent No.: US 11,909,446 B2
(45) Date of Patent: *Feb. 20, 2024

(54) DATA TRANSMISSION METHOD, RELATED APPARATUS, AND SYSTEM

(71) Applicant: Huawei Technologies Co., Ltd., Shenzhen (CN)

(72) Inventors: Xuming Wu, Wuhan (CN); Shengping Li, Shenzhen (CN); Lei Zhou, Shenzhen (CN); Xiaofei Zeng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/962,840

(22) Filed: Oct. 10, 2022

(65) Prior Publication Data

US 2023/0044724 A1    Feb. 9, 2023

Related U.S. Application Data

(63) Continuation of application No. 17/195,920, filed on Mar. 9, 2021, now Pat. No. 11,509,395, which is a continuation of application No. PCT/CN2018/104904, filed on Sep. 10, 2018.

(51) Int. Cl.
*H04B 10/27* (2013.01)
*H04L 7/00* (2006.01)
*H04L 25/03* (2006.01)

(52) U.S. Cl.
CPC ......... *H04B 10/27* (2013.01); *H04L 7/0075* (2013.01); *H04L 25/03878* (2013.01)

(58) Field of Classification Search
CPC .... H04B 10/27; H04J 14/0278; H04L 7/0075; H04L 25/03878
See application file for complete search history.

(56) References Cited

U.S. PATENT DOCUMENTS

| 8,190,026 | B2 | 5/2012 | Luo et al. |
| 9,178,713 | B1 | 11/2015 | Johnston et al. |
| 11,509,395 | B2* | 11/2022 | Wu .................... H04L 7/0075 |
| 2002/0171895 | A1 | 11/2002 | Chang |
| 2008/0089686 | A1* | 4/2008 | Kazawa ............... H04J 3/1694 |
| | | | 398/71 |

(Continued)

FOREIGN PATENT DOCUMENTS

| CN | 101136703 A | 3/2008 |
| CN | 101252388 A | 8/2008 |

(Continued)

*Primary Examiner* — Dzung D Tran
(74) *Attorney, Agent, or Firm* — Conley Rose, P.C.

(57) ABSTRACT

A data transmission method includes receiving, by an optical line terminal (OLT) from an optical network unit (ONU), uplink burst data that includes a synchronization data block and a payload, where the synchronization data block includes first synchronization data, wherein the first synchronization data includes a first preamble and an ONU identifier, and a first bandwidth occupied by the first frequency distribution of the first synchronization data is narrower than a second bandwidth occupied by the second frequency distribution of the payload, and obtaining, by the OLT from the first synchronization data, the ONU identifier.

20 Claims, 8 Drawing Sheets

(56) References Cited

U.S. PATENT DOCUMENTS

| | | |
|---|---|---|
| 2009/0226170 A1 | 9/2009 | Zou |
| 2010/0142944 A1 | 6/2010 | Zou |
| 2011/0097076 A1 | 4/2011 | Geng et al. |
| 2012/0141139 A1 | 6/2012 | Bakhru et al. |
| 2013/0094861 A1* | 4/2013 | Luo ................ H04J 14/0246 398/68 |
| 2015/0043908 A1* | 2/2015 | Prause ................ H04B 10/27 398/34 |
| 2017/0223438 A1 | 8/2017 | Detwiler et al. |

FOREIGN PATENT DOCUMENTS

| | | |
|---|---|---|
| CN | 101442692 A | 5/2009 |
| CN | 102648590 A | 8/2012 |
| JP | 2008054006 A | 3/2008 |
| JP | 2011045150 A | 3/2011 |
| JP | 2017152773 A | 8/2017 |
| KR | 20090083634 A | 8/2009 |
| KR | 20090132523 A | 12/2009 |
| WO | 2009152758 A1 | 12/2009 |

* cited by examiner

DATA TRANSMISSION METHOD, RELATED APPARATUS, AND SYSTEM

CROSS-REFERENCE TO RELATED APPLICATIONS

This application is a continuation of U.S. patent application Ser. No. 17/195,920, filed on Mar. 9, 2021, which is a continuation of International Application No. PCT/CN2018/104904 filed on Sep. 10, 2018. The aforementioned patent applications are hereby incorporated by reference in their entireties.

TECHNICAL FIELD

This application relates to the field of passive optical network (PON) technologies, and in particular, to a data transmission method, a related apparatus, and a system.

BACKGROUND

In recent years, broadband access technologies develop rapidly, and a PON is applied on a large scale and is expanded rapidly. As a demand for user data increases, a 10-Gigabit-capable (10G) PON has entered a stage of scaled deployment, and a standard of a next-generation PON system is gradually being developed and improved.

As a transmission rate of the next-generation PON system increases, a bandwidth of a current optical device cannot meet the requirements. An effective solution in the next-generation PON system is to use an electrical domain equalization technology to compensate for an insufficient bandwidth of the optical device.

The PON system is a point-to-multipoint communications system, and uplink data is transmitted in a burst mode. In different time periods, an optical line terminal (OLT) receives data from different optical network units (ONUs). Optical modules of different ONUs may support different bandwidths. Distances between different ONUs and the OLT may be different. When the electrical domain equalization technology is used, operating parameters of the electrical-domain equalizer on an OLT side may also be different. In a current operating mode in the PON system, when uplink burst data is received, the equalizer of the OLT may not recognize which ONU the received data is from, and the equalizer needs to be optimized and converged using a long preamble or long training code. During optimization and convergence, the ONU cannot send valid service data. As a result, uplink efficiency of the PON system decreases and an effective bandwidth of the system is affected.

In the PON system, if the OLT can quickly identify which ONU the uplink burst data is from, an operating parameter of the electrical-domain equalizer may be configured in advance. In this way, time for optimizing and converging the equalizer is reduced, and the uplink efficiency of the PON system is improved. However, in a current PON system, there lacks a technology to quickly identify which ONU the uplink burst data is from. Therefore, a new method is needed to solve the problem.

SUMMARY

This application provides a data transmission method, a related apparatus, and a system, to shorten data transmission time and improve data transmission efficiency of a PON system.

According to a first aspect, this application provides a data transmission method applying to an OLT side. The method may include that an OLT receives uplink burst data sent by an ONU, where the uplink burst data includes a synchronization data block and a payload. The synchronization data block includes first synchronization data. The first synchronization data includes a first preamble and an identifier of the ONU. A bandwidth occupied by frequency distribution of the first synchronization data is narrower than a bandwidth occupied by frequency distribution of the payload. The OLT obtains the identifier of the ONU in the first synchronization data.

During implementation of the method in the first aspect, in an uplink burst mode, the OLT may quickly identify which ONU or which group of ONUs the uplink burst data is from, and perform a corresponding operation based on the uplink burst data. This shortens data transmission time, and improves data transmission efficiency of a PON system.

In the uplink burst data, the first preamble in the first synchronization data may enable the OLT to correctly respond to the data in a short time (that is, correctly identify remaining parts, including the identifier of the ONU and the payload, in the uplink burst data except the first preamble). The identifier of the ONU is used to indicate a unique ONU or is used to indicate a group of ONUs. If the identifier of the ONU is used to indicate a group of ONUs, the ONUs in the group may have similar performance. The payload is valid data transmitted from the ONU to the OLT.

With reference to the first aspect, in an optional embodiment, the synchronization data block may further include second synchronization data, and a bandwidth occupied by frequency distribution of the second synchronization data is wider than the bandwidth occupied by the frequency distribution of the first synchronization data.

When the bandwidth occupied by the frequency distribution of the first synchronization data is narrower than the bandwidth occupied by the frequency distribution of the payload, the first synchronization data is slightly affected by a transmission channel between the OLT and the ONU (including impacts of an optical fiber and impacts of performance of an optical transceiver) in a transmission process. In this case, the OLT may skip using an equalization technology or may perform equalization on the received uplink burst data based on a preset equalization parameter, to recover the first synchronization data of the uplink burst data. Therefore, data processing time may be shortened.

With reference to the foregoing optional embodiment, optionally, a transmission rate of the second synchronization data may be equal to a transmission rate of the payload.

When the transmission rate of the second synchronization data is equal to the transmission rate of the payload, the OLT may recover a clock through the second synchronization data, and identify the payload through the recovered clock.

With reference to the foregoing optional embodiment, optionally, the bandwidth occupied by the frequency distribution of the second synchronization data is a multiple of the bandwidth occupied by the frequency distribution of the first synchronization data. Herein, the bandwidth occupied by the frequency distribution of the second synchronization data may be an integer multiple or a non-integer multiple of the bandwidth occupied by the frequency distribution of the first synchronization data. This is not limited in this application.

Herein, if the bandwidth occupied by the frequency distribution of the second synchronization data is a multiple of the bandwidth occupied by the frequency distribution of the first synchronization data, time for recovering the second clock that is applicable to the payload may be shortened, and a data processing speed may be improved.

With reference to the foregoing optional embodiment, optionally, the second synchronization data may include a second preamble, where the second preamble may be used by the OLT to identify the payload of the uplink burst data. Optionally, the second synchronization data may further include a second delimiter. The second delimiter is located behind the second preamble, and may be used by the OLT to more quickly locate the payload of the uplink burst data.

With reference to the first aspect and any one of the foregoing optional manners, the first synchronization data may further include a first delimiter. The first delimiter may be located between the first preamble and the identifier of the ONU, or may be located behind the identifier of the ONU. This is not limited in this application. Herein, the first delimiter may be used by the OLT to more quickly locate the identifier of the ONU in the first synchronization data.

With reference to the first aspect and any one of the foregoing optional manners, optionally, that the OLT obtains the identifier of the ONU in the first synchronization data may further include that the OLT recovers a first clock based on the first preamble, and the OLT identifies the identifier of the ONU in the first synchronization data through the first clock.

Further, specific implementation of the optional manner is detailed in the following steps:

1. After receiving the uplink burst data sent by the ONU, the OLT first needs to recover the first synchronization data in the uplink burst data.

Because amplitudes and phases between different pieces of burst data differ greatly but a time interval between sending of the different pieces of burst data is small, a current clock and decision level of the OLT that are applicable for previous uplink burst data may not be applicable for currently received uplink burst data. Therefore, even if recovering the first synchronization data, the OLT cannot accurately identify specific values of each part in the first synchronization data.

2. After recovering the first synchronization data, the OLT recovers the first clock based on the first preamble.

3. The OLT identifies the identifier of the ONU in the first synchronization data through the first clock.

Herein, a frequency of the first preamble is consistent with a frequency of the identifier of the ONU. Therefore, the first clock recovered in step 2 may be used by the OLT to identify the identifier of the ONU in the first synchronization data. Optionally, in some possible cases, a code type of the identifier of the ONU is slightly different from a code type of the first preamble, and the OLT may fail to accurately identify the identifier of the ONU by mistaking the identifier of the ONU as the first preamble. In this optional case, the first synchronization data may further include a first delimiter, where the first delimiter may help the OLT to quickly and accurately identify the identifier of the ONU.

With reference to the first aspect and any one of the foregoing optional manners, optionally, the data transmission method in the first aspect may further include that the OLT configures, based on a prestored correspondence between an identifier of an ONU and an equalization parameter, an equalization parameter corresponding to the ONU identifier, and performs equalization on the payload based on the configured equalization parameter.

Herein, the equalization parameter includes, but is not limited to, at least one of a tap type of the equalizer, an order of the equalizer, a tap coefficient, and the like.

In the foregoing optional manner, the uplink data is transmitted in the PON system in a burst mode. In different time periods, a data transmit end (i.e., ONU) may change, and a channel between the data transmit end (i.e., ONU) and a data receive end (i.e., OLT) may also change. Therefore, an equalization parameter used by the data receive end to perform equalization processing on data may need to be updated with the channel. In this application, an equalization parameter corresponding to an identifier of each ONU may be obtained and stored in advance through training. The equalization parameter may reflect an impact of the channel between the OLT and the ONU on transmission data. Herein, a process of training and storing may include following steps:

1. The OLT receives a first message sent by the ONU, where the first message includes a third preamble and a registration request.

2. The OLT determines an equalization parameter based on the received third preamble.

3. The OLT stores a correspondence between an identifier of the ONU and the determined equalization parameter.

Through the foregoing process, the OLT may learn, in the PON system, of the impact of the channel between the OLT and each ONU on transmitted data. Then, the OLT may determine, based on the impact, an equalization parameter corresponding to each transmission channel, and correspond the determined equalization parameter to the identifier of the ONU.

In the foregoing optional manner, the OLT processes the payload using the equalization technology, to compensate for an insufficient bandwidth of an optical device. Therefore, performance of an optical device with a relatively low bandwidth may have equal or even better performance than an optical device with a relatively high bandwidth. Optical devices (including the OLT and the ONU) with a relatively low bandwidth may also implement uplink high rate data transmission. In this case, access network cost may be reduced while a high rate data transmission requirement of a next-generation PON system is met. In addition, in the uplink burst mode, when receiving uplink burst data, the OLT may configure a corresponding equalization parameter based on an identifier of the ONU, and a training process is not needed for obtaining the equalization parameter. Therefore, fast convergence may be implemented, and uplink overheads may be reduced. In addition, an effective uplink bandwidth may be ensured, and uplink data transmission efficiency of the PON system may be improved.

According to a second aspect, this application provides a data transmission method applying to an ONU side. The method may include that the ONU generates uplink burst data, where the uplink burst data includes a synchronization data block and a payload. The synchronization data block includes first synchronization data. The first synchronization data includes a first preamble and an identifier of the ONU. A bandwidth occupied by frequency distribution of the first synchronization data is narrower than a bandwidth occupied by frequency distribution of the payload. The ONU sends the uplink burst data to the OLT.

Herein, a structure and a function of the uplink burst data described in the second aspect and described in the first aspect are the same. Refer to the related description in the first aspect. Details are not described herein.

According to a third aspect, this application provides an OLT configured to perform the data transmission method described in the first aspect. The OLT may include a memory and a processor coupled to the memory. The memory is configured to store implementation code of the data transmission method described in the first aspect. The processor is configured to execute the program code stored in the memory, that is, perform the method provided in the first aspect or the method provided in any one of the possible implementations of the first aspect.

According to a fourth aspect, this application provides an ONU configured to perform the data transmission method described in the second aspect. The ONU may include a memory and a processor coupled to the memory. The memory is configured to store implementation code of the data transmission method described in the second aspect. The processor is configured to execute the program code stored in the memory, that is, perform the method provided in the second aspect or the method provided in any one of the possible implementations of the second aspect.

According to a fifth aspect, this application provides an OLT. The OLT may include a plurality of function modules configured to correspondingly perform the method provided in any one of the first aspect or the possible implementations of the first aspect.

According to a sixth aspect, this application provides an ONU. The ONU may include a plurality of function modules configured to correspondingly perform the method provided in any one of the second aspect or the possible implementations of the second aspect.

According to a seventh aspect, this application provides a PON system. The PON system includes an OLT and an ONU. The OLT may be the OLT described in the third aspect, and the ONU may be the ONU described in the fourth aspect. Alternatively, the OLT may be the OLT described in the fifth aspect, and the ONU may be the ONU described in the sixth aspect.

According to an eighth aspect, this application provides a computer-readable storage medium. The readable storage medium stores an instruction. When the instruction is run on a computer, the computer is enabled to perform the data transmission method described in the first aspect.

According to a ninth aspect, this application provides a computer program product including an instruction. When the computer program product is run on a computer, the computer is enabled to perform the data transmission method described in the first aspect.

According to a tenth aspect, this application provides a computer-readable storage medium. The readable storage medium stores an instruction. When the instruction is run on a computer, the computer is enabled to perform the data transmission method described in the second aspect.

According to an eleventh aspect, this application provides a computer program product including an instruction. When the computer program product is run on a computer, the computer is enabled to perform the data transmission method described in the second aspect.

During implementation of this application, in an uplink burst mode, the OLT may quickly identify which ONU or which group of ONUs the uplink burst data is from, and perform a corresponding operation based on the uplink burst data. This shortens data transmission time, and improves data transmission efficiency of a PON system.

DESCRIPTION OF EMBODIMENTS

Some terms used in implementations of this application are merely used to explain specific embodiments of this application, but are not intended to limit this application.

Figure 1:
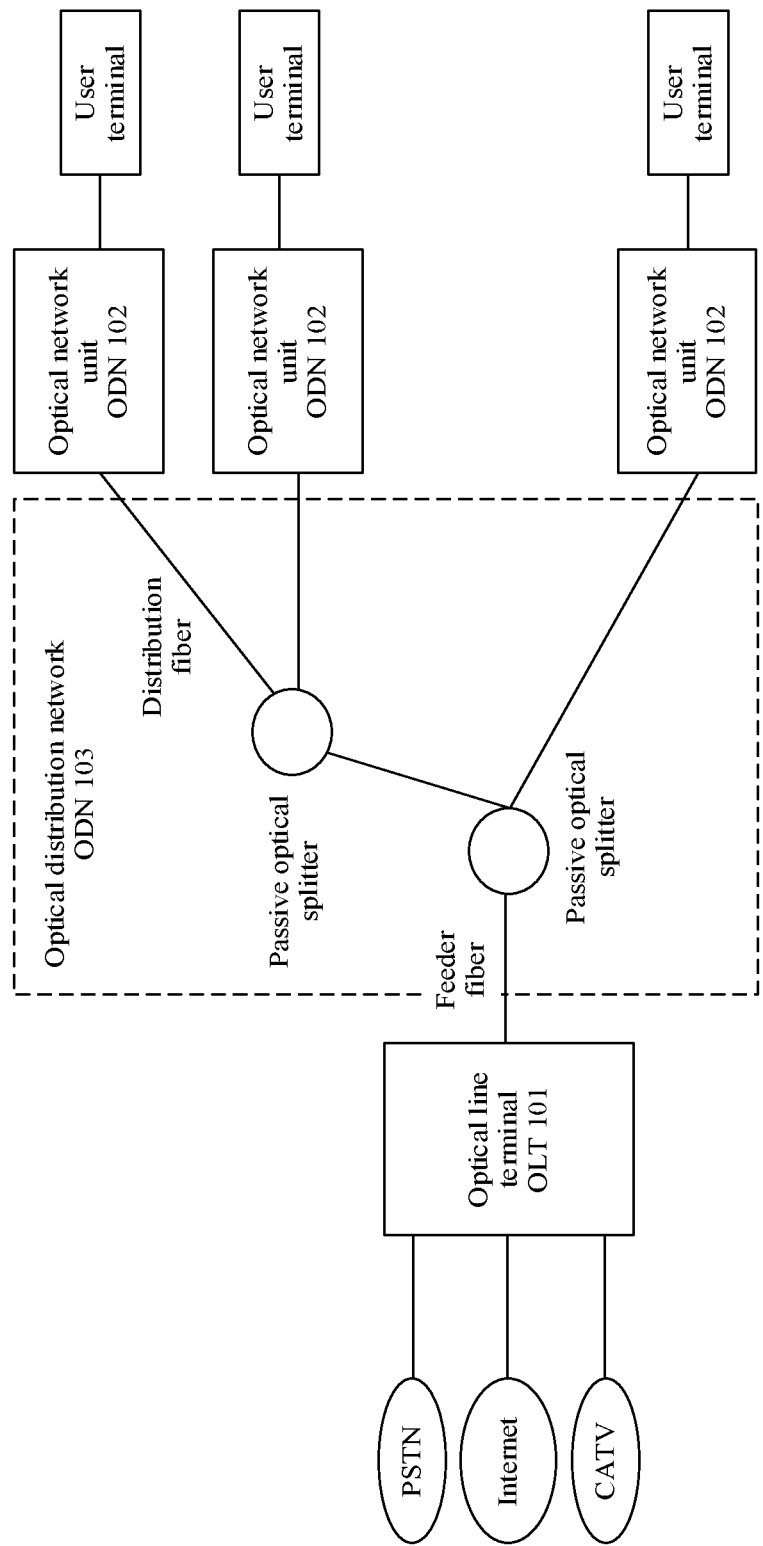
FIG. 1 is a schematic structural diagram of a communications system according to this application.

To better describe the data transmission method provided in this application, a communications system used in the method in this application is first described. FIG. 1 is a schematic structural diagram of a communications system PON 100 according to this application. The PON 100 may perform high rate data transmission, and is not limited to an Ethernet PON (EPON) system (such as a 10G EPON and a 50-Gigabit-capable (50G) EPON), a gigabit PON (GPON) system (such as a 10G GPON and a 50G GPON), an XG-PON system, or may be an evolved PON system in the future.

As shown in FIG. 1, the PON 100 is applied to an access network, and is configured to connect various terminal devices to a core network. The PON 100 may include an OLT 101, one or more ONU 102, and an optical distribution network (optical distribution network, ODN) 103 connecting the OLT 101 and the ONU 102.

The OLT 101 is located in a central office and is configured to provide an optical fiber interface for a user-oriented PON. The OLT 101 is connected to an upper-layer network (a public switched telephone network (PSTN), the Internet, a cable television (CATV), or the like shown in FIG. 1) in the uplink, to complete uplink access of the PON system. The OLT 101 is connected to the ONU 102 through the ODN to implement functions such as control, management, and ranging on the ONU 102. In this application, the OLT 101 may include an equalizer configured to perform equalization on uplink data sent by the ONU 102, to eliminate impact of channel fading, inter-code interference, and the like on uplink data transmission. This may improve uplink data transmission efficiency of the PON 100, and compensate for an insufficient bandwidth of the OLT 101. Therefore, performance of the OLT 101 may be equal or be better than that of an OLT with a wider bandwidth.

The ONU 102 is located on a user side and is customer-premises equipment. The ONU 102 provides a user-side interface for the PON 100. If an ONU directly provides a function of a user port, such as an Ethernet user port used for Internet access of a personal computer (PC), the ONU is referred to as an optical network terminal (ONT). The ONU 102 and an OLT 101 cooperate to implement functions of an Ethernet layer 2 and an Ethernet layer 3, and provide users with services such as voice, data, and multimedia. The ONU 102 may choose to receive data sent by the OLT 101, and may further receive and buffer Ethernet data of a user sent by a user terminal (such as a mobile phone or a computer), and send the Ethernet data in the uplink through a send window allocated by the OLT 101.

The ODN 103 includes an optical fiber (for example, a feeder fiber and a distribution fiber shown in FIG. 1) and one or more passive optical devices such as a passive optical splitter. The ODN 103 provides an optical channel between the OLT and the ONU, to distribute or multiplex data between the OLT 101 and the ONU 102.

In this application, the PON 100 shown in FIG. 1 is a point-to-multipoint time division multiplexing (time division multiplexing, TDM) system. A direction from the OLT to the ONU is referred to as a downlink, and a direction from the ONU to the OLT is referred to as an uplink. Uplink data transmission is in a burst mode. To be specific, the OLT 101 receives data from different ONUs 102 at different moments. In a specific time period, the OLT 101 can receive data sent by merely one ONU 102. In the burst mode, data received by the OLT 101 in different time periods comes from different ONUs 102. As distances and channel conditions between the OLT 101 and different ONUs 102 are different, a delay and attenuation for the data are also different.

This application discusses, in an uplink burst mode of a PON system, how an OLT quickly identifies which ONU or which group of ONUs uplink burst data is from in order to perform a corresponding operation based on the uplink burst data. This shortens data transmission time, and improves data transmission efficiency of the PON system.

Figure 2:
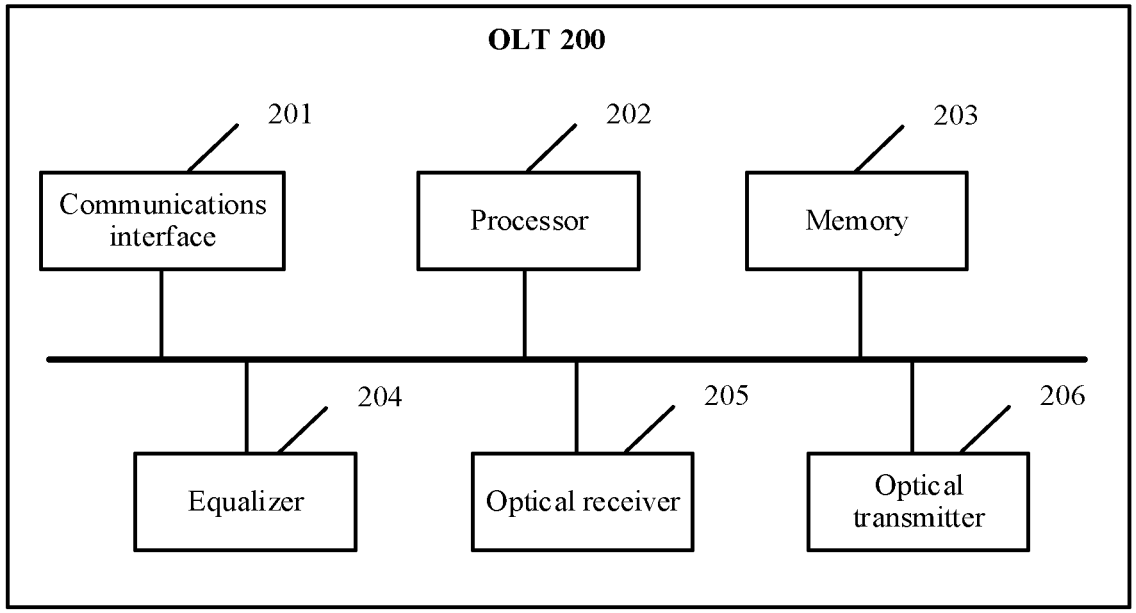
FIG. 2 is a schematic structural diagram of an OLT according to this application.

FIG. 2 is a schematic structural diagram of an OLT 200 according to this application. The OLT 200 may be implemented as the OLT 101 in the PON system shown in FIG. 1. As shown in FIG. 2, the OLT 200 may include a communications interface 201, one or more processor 202, a memory 203, an equalizer 204, an optical receiver 205, and an optical transmitter 206. These components may be connected by a bus or in another manner.

The communications interface 201 may be used by the OLT 200 to communicate with another communications device, for example, an ONU or an upper-layer network device. In specific implementation, the communications interface 201 may include a wired communications interface (for example, an Ethernet interface or an optical fiber interface) and a wireless communications interface.

The memory 203 is coupled to the processor 202, and is configured to store various software programs and/or a plurality of sets of instructions. In specific implementation, the memory 203 may include a high-speed random-access memory (RAM), and may further include a nonvolatile memory, for example, one or more magnetic disk storage devices, a flash memory device, or another nonvolatile solid-state storage device. The memory 203 includes a built-in operating system, such as LINUX, UCOS, VXWORKS, or RTLINUX. The memory 203 may further include a built-in network communications program, where the network communications program may be used to communicate with another device in the PON system.

In some embodiments of this application, the memory 203 may be configured to store a program for implementing, on an OLT side, the data transmission method provided in one or more embodiments of this application. For implementation of the data transmission method provided in this application, refer to the following embodiments. In an optional embodiment, the memory 203 may further store a correspondence between identifiers of a plurality of ONUs in the PON system and equalization parameters. For the correspondence between the identifier of the ONU and the equalization parameter in this application, refer to the following embodiments.

The controller processor 202 may be a general purpose processor, for example, a central processing unit (CPU). The processor 202 may further include a hardware chip. The hardware chip may be a combination of one or more of an application-specific integrated circuit (ASIC), a field-programmable gate array (FPGA), or a complex programmable logic device (CPLD). The processor 202 may process data received by the communications interface 201, and the processor 202 may further process data that is to be sent to the communications interface 201 for transmission over a wireless transmission medium. In an optional embodiment, the processor 202 may be configured to configure an operating parameter of the equalizer 204. For the operating parameter of the equalizer 204, refer to the following embodiments.

In this application, the processor 202 may be configured to read and execute a computer-readable instruction. Further, the processor 202 may be configured to invoke a program stored in the memory 203, for example, a program for implementing, on the OLT side, the data transmission method provided in one or more embodiments of this application, and execute an instruction included in the program.

In this application, the processor 202 is configured to obtain the identifier of the ONU carried in uplink burst data sent by the ONU, to identify which ONU or which group of ONUs the uplink burst data is from. In some embodiments, the processor 202 is further configured to determine, based on a prestored correspondence that is between an identifier of an ONU and an equalization parameter and that is in the memory 203, an equalization parameter corresponding to the identifier of the ONU.

The equalizer 204 is configured to process a signal output by the optical receiver 205, to optimize signal quality. The equalizer 204 may be mainly configured to compensate an optical device for an insufficient bandwidth that affects high-rate data, and compensate for signal distortion caused by factors such as inter-code interference and channel fading that affect the data on a transmission channel (that is, an optical fiber), to correctly recover data sent to a peer end. Optionally, the equalizer 204 may be implemented using a filter. In some embodiments, the equalizer 204 is configured to perform configuration based on the equalization parameter determined by the processor 202, and perform equalization, based on the configured equalization parameter, on a payload that is in the uplink burst data.

The optical receiver 205 is configured to perform optical-to-electrical signal conversion. To be specific, the optical receiver 205 is configured to receive an uplink burst optical signal (that is, uplink burst data), and convert the optical signal into an electrical signal.

The optical transmitter 206 is configured to perform electrical-to-optical signal conversion. To be specific, the optical transmitter 206 is configured to convert a downlink electrical signal (that is, downlink data) generated by the processor 202 into an optical signal, and send the optical signal to a corresponding ONU through an ODN.

The OLT 200 shown in FIG. 2 is merely an implementation of this application. In actual application, the OLT 200 may further include more or fewer components. This is not limited herein.

Figure 3:
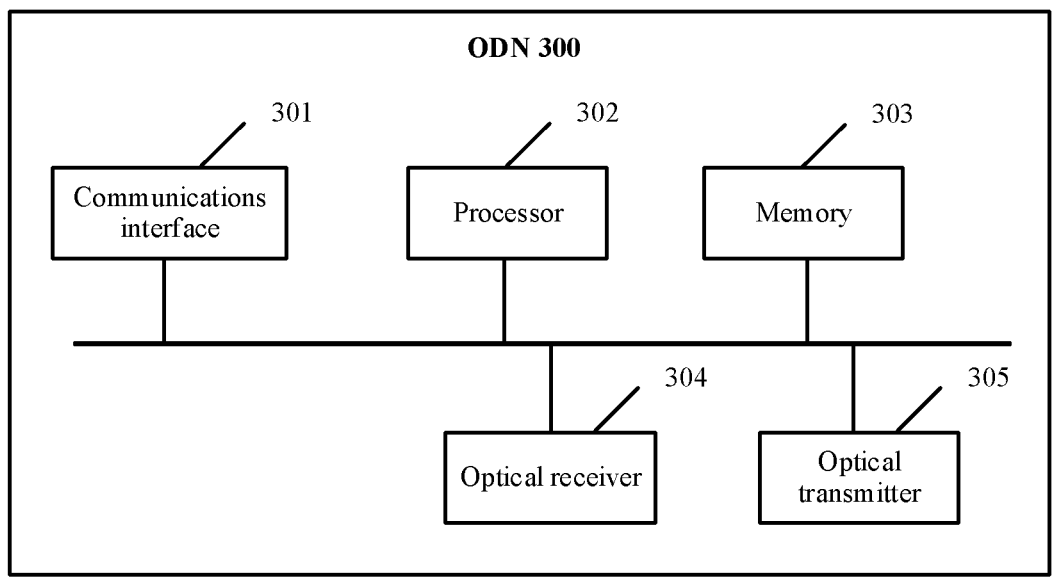
FIG. 3 is a schematic structural diagram of an ONU according to this application.

FIG. 3 is a schematic structural diagram of an ONU 300 according to this application. The ONU 300 may be implemented as the ONU 102 in the PON system shown in FIG. 1. As shown in FIG. 3, the ONU 300 may include a communications interface 301, one or more processor 302, a memory 303, an optical receiver 304, and an optical transmitter 305. These components may be connected by a bus or in another manner.

The communications interface 301 may be used by the ONU 300 to communicate with another communications device, for example, an OLT or a user terminal. In specific implementation, the communications interface 301 may include a wired communications interface (for example, an Ethernet interface or an optical fiber interface) and a wireless communications interface.

The memory 303 is coupled to the processor 302, and is configured to store various software programs and/or a plurality of sets of instructions. In specific implementation, the memory 303 may include a high-speed RAM, and may further include a nonvolatile memory, for example, one or more magnetic disk storage devices, a flash memory device, or another nonvolatile solid-state storage device. The memory 303 includes a built-in operating system, such as LINUX, UCOS, VXWORKS, or RTLINUX. The memory 303 may further include a built-in network communications program, where the network communications program may be used to communicate with another device in the PON system.

In some embodiments of this application, the memory 303 may be configured to store a program for implementing, on the ONU side, the data transmission method provided in one or more embodiments of this application. For implementation of the data transmission method provided in this application, refer to the following embodiments.

The controller processor 302 may be a general purpose processor, for example, a CPU. The processor 301 may further include a hardware chip. The hardware chip may be a combination of one or more of an ASIC, an FPGA, or a CPLD. The processor 302 may process data received by the communications interface 301, and the processor 302 may further process data that is to be sent to the communications interface 301 for transmission over a wireless transmission medium.

In this application, the processor 302 may be configured to read and execute a computer-readable instruction. Further, the processor 302 may be configured to invoke a program stored in the memory 303, for example, a program for implementing, on the ONU side, the data transmission method provided in one or more embodiments of this application, and execute an instruction included in the program.

The optical receiver 304 is configured to perform optical-to-electrical signal conversion. To be specific, the optical receiver 304 is configured to receive a downlink optical signal (that is, downlink data) sent by the OLT, and convert the optical signal into an electrical signal.

The optical transmitter 305 is configured to perform electrical-to-optical signal conversion. To be specific, the optical transmitter 305 is configured to convert an uplink electrical signal (that is, uplink burst data) generated by the processor 302 into an optical signal, and sends the optical signal to the OLT through an ODN.

The ONU 300 shown in FIG. 3 is merely an implementation of this application. In actual application, the ONU 300 may further include more or fewer components. This is not limited herein.

Based on the foregoing point-to-multipoint communications system, that is, the PON 100, the OLT 200, and the ONU 300, this application provides a data transmission method. The method may be applied to the point-to-multipoint communications system. In an uplink burst mode, an OLT may quickly identify which ONU an uplink burst data is from, and perform a corresponding operation based on the uplink burst data. This shortens data transmission time, and improves data transmission efficiency of a PON system.

Figure 4:
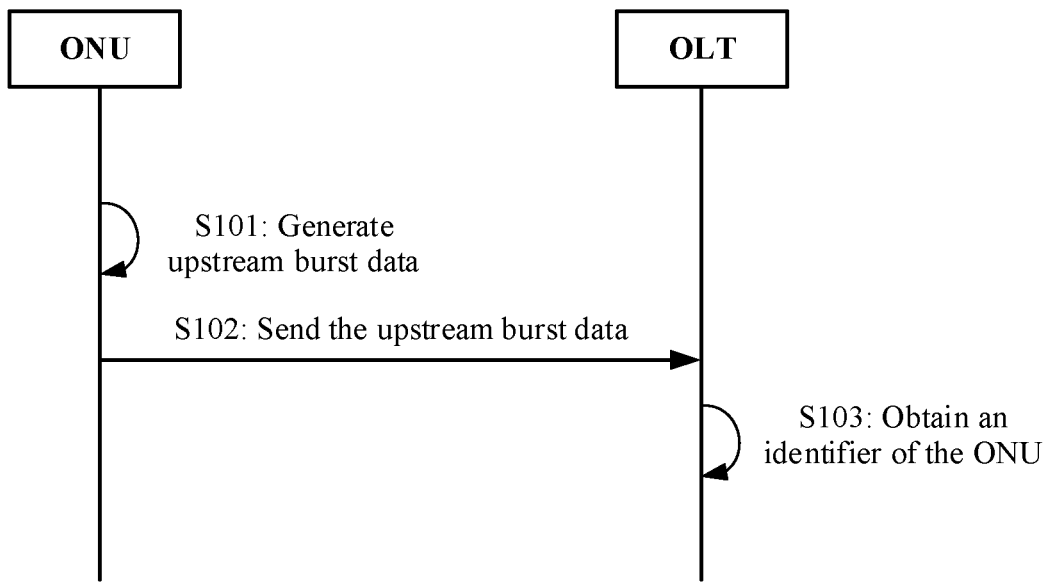
FIG. 4 is a schematic flowchart of a data transmission method according to this application.

FIG. 4 is a schematic flowchart of a data transmission method according to this application. The method may be applied to the PON system shown in FIG. 1.

As shown in FIG. 4, this method includes the following steps.

S101: An ONU generates uplink burst data, where the uplink burst data includes a synchronization data block and a payload. The synchronization data block includes first synchronization data. The first synchronization data includes a first preamble and an identifier of the ONU. A bandwidth occupied by frequency distribution of the first synchronization data is narrower than a bandwidth occupied by frequency distribution of the payload.

S102: The ONU sends the uplink burst data to an OLT, and correspondingly, the OLT receives the uplink burst data sent by the ONU.

Herein, the OLT may be the OLT 101 in the PON 100 shown in FIG. 1, or may be the OLT 200 shown in FIG. 2. The ONU may be the ONU 102 in the PON 100 shown in FIG. 1, or may be the ONU 300 shown in FIG. 3.

Figure 5:
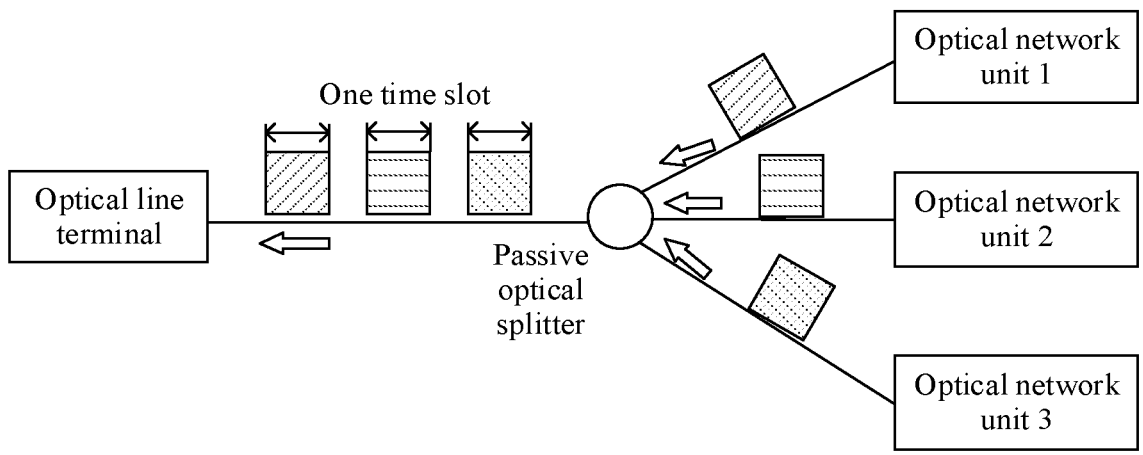
FIG. 5 is a schematic diagram of a scenario of uplink data transmission in a PON system according to this application.

In this application, a direction from the ONU to the OLT is an uplink direction. In the uplink direction, data is transmitted using time division multiplexing. Referring to FIG. 5, uplink transmission time is divided into several time slots, and each time slot may be used by one ONU to send data. That is, uplink data transmission is in a burst mode, and the OLT may receive uplink burst data from different ONUs in different time slots.

Figure 6:
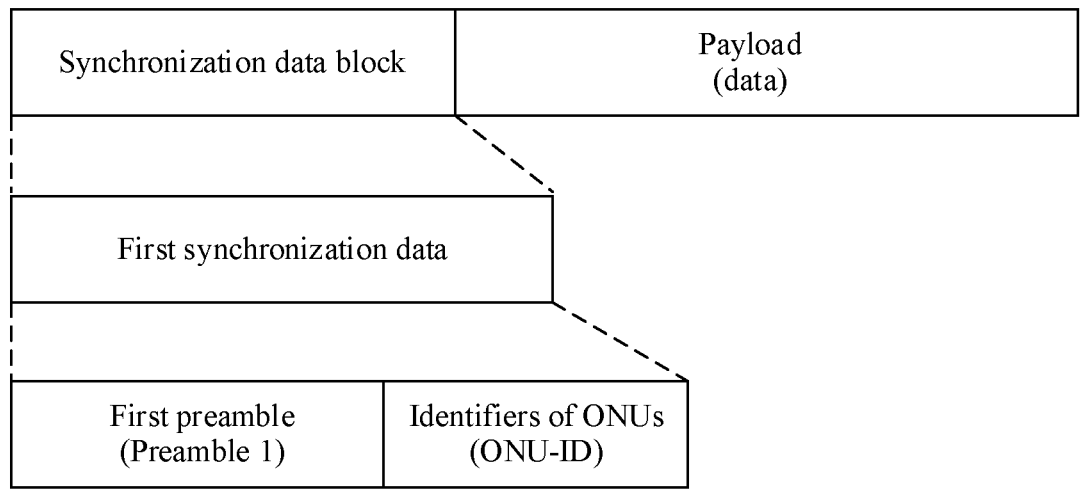
FIG. 6 is a schematic diagram of a structure of uplink burst data according to this application.

The following describes in detail a structure of the uplink burst data in this application. FIG. 6 is a schematic diagram of a structure of the uplink burst data according to this application. As shown in the figure, the uplink burst data includes the synchronization data block and the payload (data). The synchronization data block includes the first synchronization data, where the first synchronization data includes the first preamble (preamble1) and the identifier (ONU-ID) of the ONU.

Figure 7:
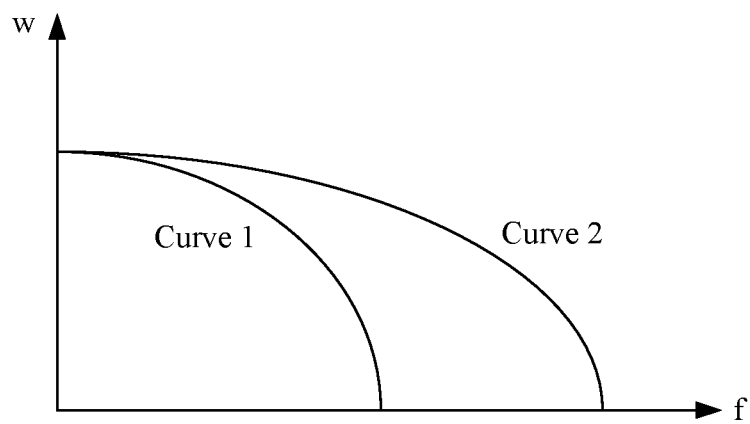
FIG. 7 is a schematic diagram of data frequency distribution according to this application.

In the uplink burst data, the bandwidth occupied by the frequency distribution of the first synchronization data is narrower than the bandwidth occupied by the frequency distribution of the payload. FIG. 7 is a schematic diagram of data frequency distribution. As shown in the figure, a horizontal axis indicates frequency (f), and a vertical axis indicates an amplitude (w). A curve shown in FIG. 7 indicates data frequency distribution, and an area between the curve and coordinate axes may indicate a bandwidth occupied by the frequency distribution of the data. In a specific example, a curve 1 may indicate the frequency distribution of the first synchronization data, and a curve 2 may indicate the frequency distribution of the payload. A bandwidth occupied by the curve 1 is narrower than a bandwidth occupied by the curve 2. That is, the bandwidth occupied by the frequency distribution of the first synchronization data is narrower than the bandwidth occupied by the frequency distribution of the payload. Optionally, the bandwidth occupied by the frequency distribution of the payload may be consistent with a bandwidth required for high rate data transmission of the PON system.

It can be learned from FIG. 7 that, a curve that occupies a narrower bandwidth corresponds to lower frequency distribution. That is, in this application, a frequency of the first synchronization data is lower than a frequency of the payload. When the frequency of the first synchronization data is lower than the frequency of the payload, a transmission rate of the first synchronization data may be slower than or equal to a transmission rate of the payload.

Figure 8A:
FIGS. 8A, 8B, and 8C are sequence diagrams of digital signal phases according to this application.
Figure 8B:
Figure 8C:

The following describes in detail a relationship between a frequency and a transmission rate of a digital signal. FIGS. 8A-8C are diagrams of a phase sequences of three digital signals. Among the three digital signals shown in FIGS. 8A-8C, a digital signal encoding frequency in FIG. 8A is higher than digital signal encoding frequencies in FIG. 8B and FIG. 8C. When the digital signal shown in FIGS. 8A-8C are transmitted, a data transmission rate of FIG. 8A is the same as a data transmission rate of FIG. 8C, and a data transmission rate of FIG. 8A is four times a data transmission rate of FIG. 8B. That is, a transmission rate of a digital signal with a lower frequency may be the same as a transmission rate of a digital signal with a higher frequency (for example, the digital signals shown in FIG. 8C and FIG. 8A), or may be slower than a transmission rate of a digital signal with a higher frequency (for example, the digital signals shown in FIG. 8B and FIG. 8A).

In the synchronization data block of the uplink burst data, the first synchronization data includes the first preamble. In the uplink burst mode, because amplitudes and phases between different pieces of burst data from different ONUs differ greatly but a time interval between sending of the different pieces of burst data is small, the OLT needs to respond to burst data with abrupt amplitude and phase changes in a short time. Herein, the first preamble in the first synchronization data may enable the OLT to correctly respond to the data in a short time (that is, to correctly identify remaining parts, including the identifier of the ONU and the payload, in the uplink burst data except the first preamble). For how the OLT correctly identifies the identifier of the ONU and the payload based on the first preamble, refer to related descriptions in step S103.

In the synchronization data block of the uplink burst data, the first synchronization data further includes the identifier of the ONU. The identifier of the ONU is used to indicate a unique ONU or is used to indicate a group of ONUs. That is, the identifier of the ONU in the synchronization data block may indicate which ONU or which group of ONUs the current burst data block is from. If the identifier of the ONU is used to indicate a group of ONUs, the ONUs in the groups may have similar performance. For example, the ONUs in the group have same bandwidths, and distances between the ONUs in the group and the OLT are similar. Herein, the identifier of the ONU may be a logical link identifier (LLID), a vendor-specific serial number (VS SN), a media access control (MAC) address, or may be another identifier. This is not limited in this application.

In the uplink burst data, the payload is valid data transmitted from the ONU to the OLT.

FIG. 6 shows the structure of uplink burst data in this application. In specific implementation, the uplink burst data in this application may alternatively be implemented as another structure. The following lists an example of a possible structure of the uplink burst data in this application.

Figure 9:
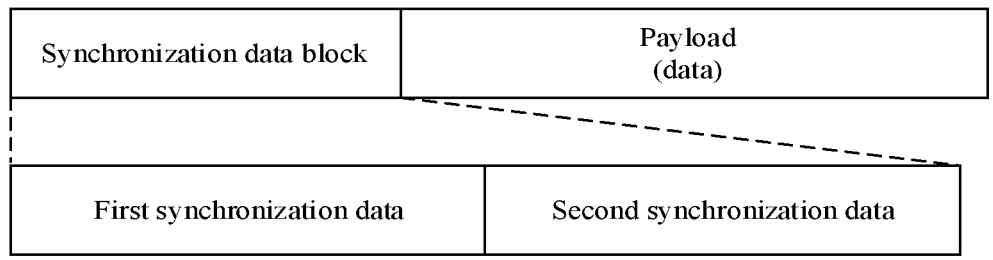
FIG. 9 is a schematic diagram of another structure of uplink burst data according to this application.

In an optional embodiment, based on the uplink burst data shown in FIG. 6, the synchronization data block further includes second synchronization data. A bandwidth occupied by frequency distribution of the second synchronization data is wider than the bandwidth occupied by the frequency distribution of the first synchronization data. FIG. 9 is a schematic diagram of a structure of the uplink burst data in the optional embodiment. For a function of the second synchronization data, refer to related descriptions in following embodiments.

Optionally, a transmission rate of the second synchronization data may be equal to the transmission rate of the payload. Optionally, the transmission amount of the payload is a data transmission rate required by the PON system.

Optionally, the bandwidth occupied by the frequency distribution of the second synchronization data is an integer multiple of the bandwidth occupied by the frequency distribution of the first synchronization data. Herein, the bandwidth occupied by the frequency distribution of the second synchronization data may be an integer multiple or a non-integer multiple of the bandwidth occupied by the frequency distribution of the first synchronization data. This is not limited in this application.

Figure 10:
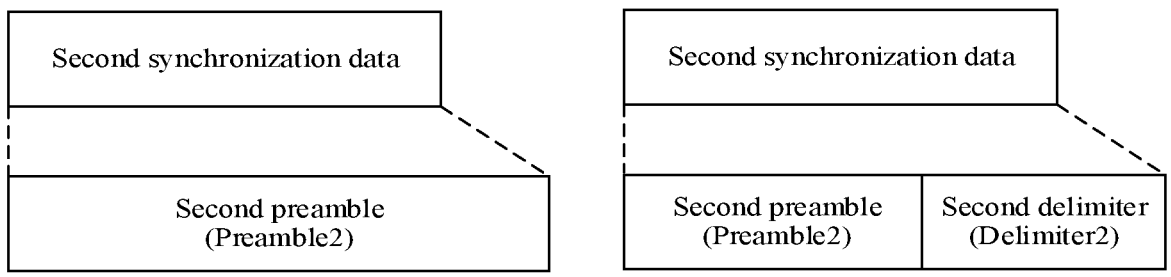
FIG. 10 is a schematic structural diagram of second synchronization data in uplink burst data according to this application.

FIG. 10 shows a possible structure of the second synchronization data in the optional embodiment shown in FIG. 9. As shown in the left diagram of FIG. 10, optionally, the second synchronization data may include a second preamble (preamble2), where the second preamble may be used by the OLT to identify the payload of the uplink burst data. Further, as shown in the right diagram of FIG. 10, the second synchronization data may further include a second delimiter (delimiter 2). The second delimiter is located behind the second preamble, and may be used by the OLT to more quickly locate the payload of the uplink burst data.

Figure 11:
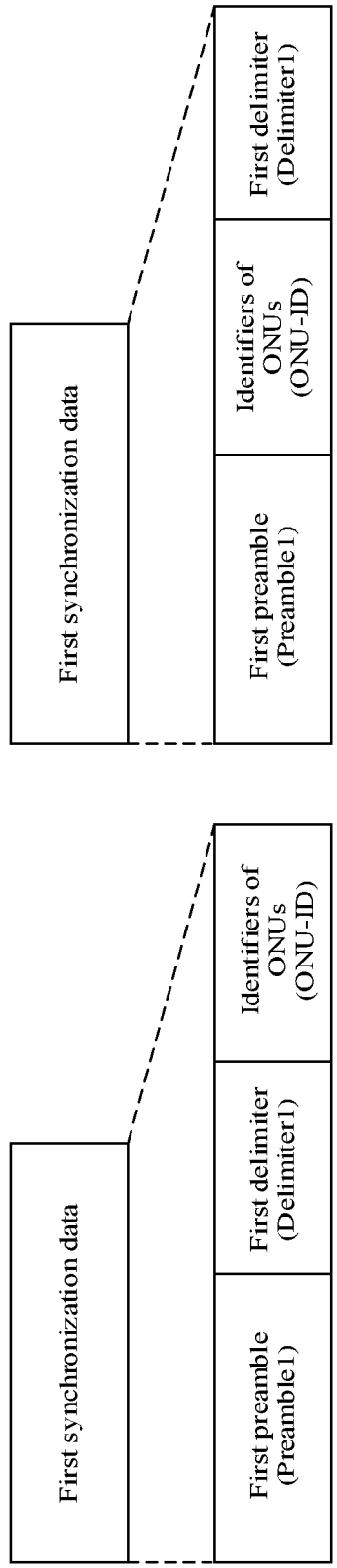
FIG. 11 is a schematic structural diagram of first synchronization data in uplink burst data according to this application.

In an optional embodiment, based on the uplink burst data shown in FIG. 6 or FIG. 9, the first synchronization data may further include a first delimiter (delimiter 1). FIG. 11 shows a possible structure of the first synchronization data in the optional embodiment. As shown in the left diagram in FIG. 11, the first delimiter may be located between the first preamble and the identifier of the ONU. As shown in the right diagram of FIG. 11, the first delimiter may alternatively be located behind the identifier of the ONU. This is not limited in this application. Herein, the first delimiter may be used by the OLT to more quickly locate the identifier of the ONU in the first synchronization data.

In the foregoing optional embodiment, in the uplink burst data, a code type of the first preamble and a code type of the second preamble may be predefined by a standard protocol, or may be determined by the OLT and then sent to the ONU. When sending uplink burst data to the OLT, ONUS in the PON system may use a same first preamble and/or second preamble, or may use different first preambles and/or second preambles. This is not limited in this application.

Optionally, the uplink burst data mentioned in this application may be implemented as an Ethernet data frame.

It may be understood that, in step S102, because the OLT and the ONU are connected through an optical fiber, the uplink burst data received by the OLT from the ONU is an optical signal. The OLT needs to convert the optical signal into an electrical signal and then perform subsequent processing (that is, perform step S103). That is, uplink burst data subsequently mentioned in this application processed by the OLT is an electrical signal.

S103: The OLT obtains the identifier of the ONU in the first synchronization data.

Further, after receiving the uplink burst data sent by the ONU, the OLT may obtain the payload in the uplink burst data, that is, the valid data sent by the ONU. The OLT may further obtain the identifier of the ONU in the first synchronization data of the uplink burst data. The OLT may learn, through the identifier of the ONU, which ONU or which group of ONUs the currently received uplink burst data is from.

The following describes, in detailed steps, specific operations performed by the OLT to obtain the identifier of the ONU in the first synchronization data.

1. After receiving the uplink burst data sent by the ONU, the OLT first needs to recover the first synchronization data in the uplink burst data.

Further, the bandwidth occupied by the frequency distribution of the first synchronization data is narrower than the bandwidth occupied by the frequency distribution of the payload. That is, the frequency of the first synchronization data is lower than the frequency of the payload. The first synchronization data is slightly affected by a transmission channel between the OLT and the ONU (including impacts of performance of an optical fiber, and impacts of performance of an optical transceiver) in a transmission process. Therefore, the OLT may skip using an equalization technology or may perform equalization on the received uplink burst data based on a preset equalization parameter, to recover the first synchronization data of the uplink burst data. The OLT may prestore the preset equalization parameter.

When the OLT skips using the equalization technology to recover the first synchronization data in the uplink burst data, a step of configuring an equalization parameter to perform equalization on the uplink burst data is skipped, and therefore data processing time is shortened. When the OLT performs equalization on the received uplink burst data using the preset equalization parameter, a process of obtaining the equalization parameter through training is skipped, and therefore data processing time may also be shortened. Therefore, in step 1, the OLT can quickly recover the first synchronization data in the uplink burst data, which takes a relatively short time.

It may be understood that, because amplitudes and phases between different pieces of burst data differ greatly but a time interval between sending of the different pieces of burst data is small, a current clock and decision level of the OLT that are applicable for previous uplink burst data may not be applicable for currently received uplink burst data. Therefore, even if recovering the first synchronization data in step 1, the OLT cannot accurately identify specific values of each part in the first synchronization data. Then, through step 2, the OLT may accurately identify the identifier of the ONU in the recovered first synchronization data.

2. The OLT recovers a first clock based on the first preamble.

Further, the first preamble may be obtained by the OLT in advance. After recovering the synchronization data block in the uplink burst data, the OLT may perform a correlation operation on the first preamble that is obtained in advance and the first preamble in the recovered synchronization data block. A phase of the received signal may be determined based on an operation result. When a phase difference between the first preamble obtained in advance and the first preamble in the restored synchronization data block is the smallest, the OLT may use the currently used clock as the first clock. That is, the OLT may recover the first clock based on the first preamble.

3. The OLT identifies the identifier of the ONU in the first synchronization data through the first clock.

Further, the frequency of the first preamble is consistent with the frequency of the identifier of the ONU. Therefore, the first clock recovered in step 2 may be used by the OLT to identify the identifier of the ONU in the first synchronization data.

Optionally, the OLT may further establish a correct decision level based on the first preamble such that a sampling instant of the identifier of the ONU is at an optimal sampling point. Therefore, the OLT may accurately identify the identifier of the ONU in the first synchronization data.

Optionally, in some possible cases, a code type of the identifier of the ONU and a code type of the first preamble is slightly different. The OLT fail to accurately identify the identifier of the ONU by mistaking the identifier of the ONU as the first preamble.

Referring to FIG. 11, the first synchronization data may further include the first delimiter, and the first delimiter may be used by the OLT to quickly and accurately identify the identifier of the ONU. Herein, the OLT may use the recovered first clock to identify the identifier of the ONU and the first delimiter in the first synchronization data. Because the first delimiter is obtained in advance, the OLT may first identify the first delimiter in the first synchronization data. Then, the OLT may quickly and accurately identify the identifier of the ONU based on a location relationship between the first delimiter and the identifier of the ONU. If a structure of the uplink burst data is shown in the left figure in FIG. 11, after identifying the first delimiter, the OLT may learn that a part after the first delimiter is the identifier of the ONU. If a structure of the uplink burst data is as what is shown in the right figure in FIG. 11, after identifying the first delimiter, the OLT may learn that a part before the first delimiter is the identifier of the ONU. Herein, the OLT may obtain a length of the identifier of the ONU in advance, to quickly identify the identifier of the ONU.

By performing step S103, the OLT may quickly and accurately identify the identifier of the ONU in the uplink burst data, and may identify, based on the identifier, which ONU or which group of ONUs the currently received uplink burst data is from.

It may be learned from the foregoing that, during implementation of the method shown in FIG. 4, in the uplink burst mode, the OLT may quickly identify which ONU or which group of ONUs the uplink burst data is from, and perform a corresponding operation based on the uplink burst data. This shortens data transmission time, and improves data transmission efficiency of a PON system.

After the implementation of the method shown in FIG. 4, the OLT may identify which ONU or which group of ONUs the current uplink burst data is from. After obtaining the payload (that is, the valid data) of the uplink burst data, the OLT may complete one valid data transmission.

When data is transmitted at a high rate in the PON system, link dispersion and a limited bandwidth of an optical device cause severe inter-code interference. Therefore, the OLT needs to perform processing on the payload of the received uplink burst data, to eliminate impact on the payload of the uplink burst data.

Currently, a channel equalization technology is effective for reducing inter-code interference in a communications system. The communication system may generate a characteristic opposite to the transmission channel through the equalizer, and perform equalization on data, to eliminate impact of the transmission channel on the data. When equalization is performed on data, a corresponding equalization parameter usually needs to be obtained in advance through the training.

For example, in a point-to-point communications system, a channel between a data transmit end and a data receive end is basically fixed, and impact of the channel on transmitted data is also relatively fixed. Therefore, the point-to-point communications system may learn the impact of the fixed channel on the data transmission through the training in an initialization phase. The OLT sets an equalization parameter of the equalizer based on the impact. The data receive end may use the equalization parameter to perform equalization on data in a subsequent data transmission, to eliminate the impact of the fixed channel on data transmission. Herein, the communications system cannot transmit valid data during the training because the training occupies an uplink bandwidth and consumes a specific time.

For the point-to-multipoint communications system shown in FIG. 1, the uplink data is transmitted in a burst mode. Therefore, in different time periods, the data transmit end (i.e., ONU) may change, and the channel between the data transmit end (i.e., ONU) and the data receive end (i.e., OLT) may change. Also, the equalization parameter used by the OLT to perform equalization on the data may need to be updated with the channel. If the equalization parameter is updated through training each time the channel changes, in this case, an uplink bandwidth is wasted, a large amount of time is consumed, and data transmission efficiency of the communications system is affected.

In the following, this application discusses, in an uplink burst mode of a PON system, how an OLT performs equalization on uplink burst data, to implement fast convergence. In this case, uplink overhead may be reduced, an effective uplink bandwidth may be ensured, and uplink data transmission efficiency of the PON system may be improved.

Figure 12:
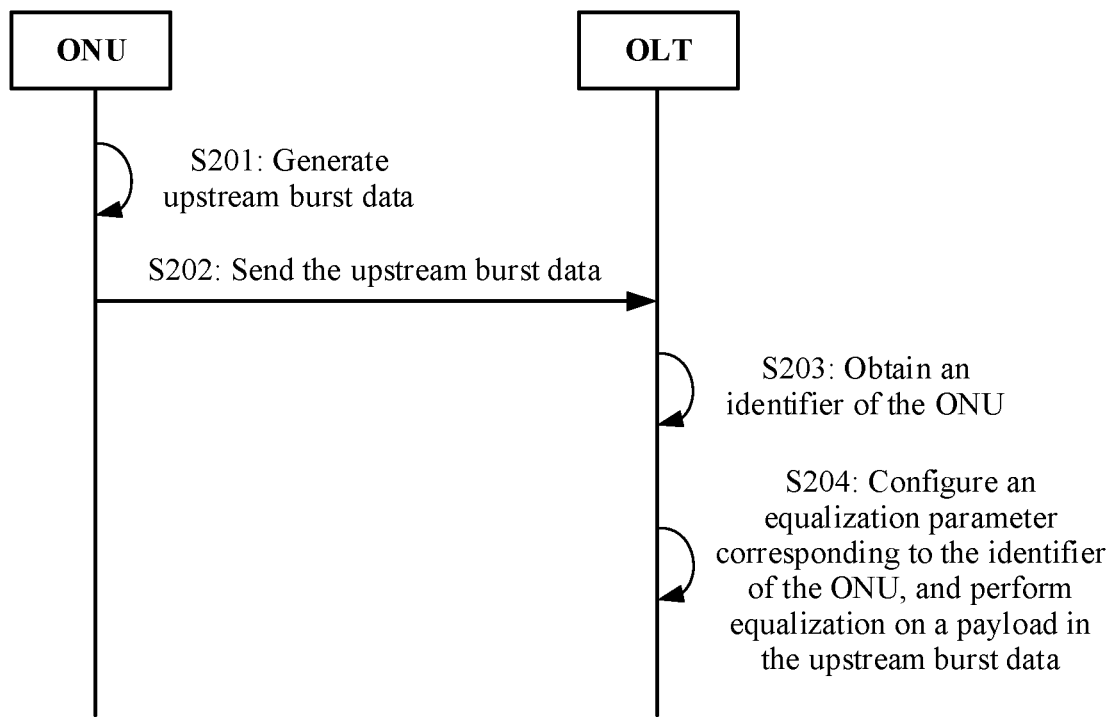
FIG. 12 is a schematic flowchart of another data transmission method according to this application.

FIG. 12 is a schematic flowchart of another data transmission method according to this application. The method may be applied to the PON system shown in FIG. 1.

As shown in FIG. 12, this method may include the following steps.

S201: An ONU generates uplink burst data, where the uplink burst data includes a synchronization data block and a payload. The synchronization data block includes first synchronization data. The first synchronization data includes a first preamble and an identifier of the ONU. A bandwidth occupied by frequency distribution of the first synchronization data is narrower than a bandwidth occupied by frequency distribution of the payload.

S202: An OLT receives the uplink burst data sent by the ONU.

S203: The OLT obtains the identifier of the ONU in the first synchronization data.

Herein, implementation of steps S201 to S203 is the same as implementation of steps S101 to S103 of the method shown in FIG. 4. For details, refer to the related description. For a structure of the uplink burst data, refer to FIG. 6 to FIG. 11 and related descriptions.

S204: The OLT configures, based on a prestored correspondence between the identifier of the ONU and an equalization parameter, the equalization parameter corresponding to the ONU identifier, and performs equalization on the payload based on the configured equalization parameter.

Further, the bandwidth occupied by the frequency distribution of the payload is wider than the bandwidth occupied by the frequency distribution of the first synchronization data. That is, the bandwidth occupied by the frequency distribution of the payload is wider and the payload is greatly affected by a transmission channel between the OLT and the ONU. Therefore, equalization needs to be performed on the payload to offset the impact.

Herein, after the PON system is deployed, a transmission channel between each ONU and the OLT is basically fixed. That is, a characteristic of the transmission channel basically remains unchanged, and impact of the transmission channel on transmitted data may be quantized and determined. Because channel conditions (such as a transmission distance, channel dispersion, and performance of an optical device) between different ONUs and the OLT are different, data from different ONUs is affected differently by channels (such as inter-code interference). When the OLT performs equalization on data from different ONUs, the equalization parameter used should be corresponding to an actual channel impact on the data. Therefore, the equalization may be performed accurately on the data.

In this application, the OLT may identify, using the identifier of the ONU in the uplink burst data, which ONU or which group of ONUs the currently received uplink burst data is from. In this case, the OLT may configure an equalization parameter corresponding to the identifier of the ONU, and perform equalization, based on the configured equalization parameter, on the payload in the uplink burst data.

Further, the OLT may store a correspondence between identifiers of a plurality of ONUs in the PON system and equalization parameters in advance. Herein, an equalization parameter corresponding to an identifier of an ONU is an equalization parameter corresponding to a transmission channel between the OLT and the ONU. Table 1 shows a possible correspondence that is between an identifier of each ONU and an equalization parameter and that is stored in an OLT.

TABLE 1

| Identifiers of ONU | Equalization Parameters |
|---|---|
| ONU-ID 1 | Equalization parameter 1 |
| ONU-ID 2 | Equalization parameter 2 |
| ONU-ID 3 | Equalization parameter 3 |
| . . . | . . . |

Herein, the equalization parameter in this application includes, but is not limited to, at least one of a tap type of the equalizer, an order of the equalizer, a tap coefficient, and the like.

According to the method shown in FIG. 12, processing the payload using the equalization technology may compensate for an insufficient bandwidth of an optical device. Therefore, performance of an optical device with a relatively low bandwidth may reach or even be better than performance of an optical device with a relatively high bandwidth. The optical device with a relatively low bandwidth (including the OLT and the ONU) may also implement uplink high rate data transmission. In this case, access network cost may be reduced while the high rate data transmission requirement of the next-generation PON system is met.

According to the method shown in FIG. 12, in the uplink burst mode, when receiving uplink burst data, the OLT may configure a corresponding equalization parameter based on an identifier of the ONU, and a training process is not needed for obtaining the equalization parameter. Therefore, fast convergence may be implemented, and uplink overheads may be reduced. In addition, an effective uplink bandwidth may be ensured, and uplink data transmission efficiency of the PON system may be improved.

According to the method shown in FIG. 12, in step S204, after the OLT performs equalization on the payload based on the configured equalization parameter, impact of the transmission channel on the payload is eliminated. In the uplink burst data, the OLT recovers, based on the first preamble in the first synchronization data, the first clock, where the first clock is not completely consistent with the clock of the payload, and may not be applicable to the payload. Therefore, the OLT cannot accurately identify a specific value of the payload on which the equalization has been performed. The following describes a manner where the OLT recovers a clock that is applicable to the payload, and identifies the specific value of the payload using the recovered clock.

As shown in FIG. 9, when the uplink burst data includes the second synchronization data, the second synchronization data may be used by the OLT to identify the payload.

Further, the OLT may recover the second clock based on the second synchronization data. Herein, the operation of the OLT to recover the second clock based on the second synchronous data is similar to the operation of the OLT to recover the first clock based on the first preamble in step S103 of the method shown in FIG. 4. For details, refer to the related description.

Optionally, a transmission rate of the second synchronization data is equal to the transmission rate of the payload. Therefore, the OLT may use the second clock to identify the payload.

Optionally, the OLT may establish a correct decision level based on the second synchronization data such that a sampling instant of the payload of the OLT is at the optimal sampling point. Therefore, the OLT may accurately identify the payload.

Optionally, referring to FIG. 10, in the case of the second synchronization data includes the second preamble, the OLT may restore the second clock and establish the decision level based on the second preamble.

Optionally, referring to the right diagram shown in FIG. 10, in the case of the second synchronization data includes the second preamble and the second delimiter, the second delimiter may be used by the OLT to quickly locate the payload. Further, the OLT may use the second clock to identify the delimiter and the payload in the second synchronization data. As the second delimiter is obtained in advance, the OLT may first identify the second delimiter in the second synchronization data. Then, the OLT, based on a location relationship between the second delimiter and the payload (that is, the payload is located behind the second delimiter), quickly and accurately identifies the payload. Using the second delimiter, a case in which a code type difference between the payload and the second preamble is relatively small and the OLT cannot accurately identify the payload may be avoided.

Optionally, if a bandwidth occupied by frequency distribution of the second synchronization data is a multiple of the bandwidth occupied by the frequency distribution of the first synchronization data, the second clock may be preliminarily determined based on a multiple relationship between the bandwidth occupied by the frequency distribution of the second synchronization data and the bandwidth occupied by the frequency distribution of the first synchronization data, after the OLT recovers, according to step S203 of the method shown in FIG. 12, the first clock based on the first preamble. In step S204, the OLT only needs to correct the second clock that is preliminarily determined, to obtain the second clock applicable to the payload. In this manner, in step S204, the time for the OLT to determine the second clock to identify the payload may be reduced, and the data processing speed may also be improved.

In the method shown in FIG. 12, the equalization parameter that is stored in the OLT and that corresponds to each identifier of the ONUs may be obtained through the training. The training is separately performed by the OLT and each ONU in the PON system, to obtain the corresponding equalization parameter. The training may be implemented before the method shown in FIG. 12, that is, implemented before step S201.

Figure 13:
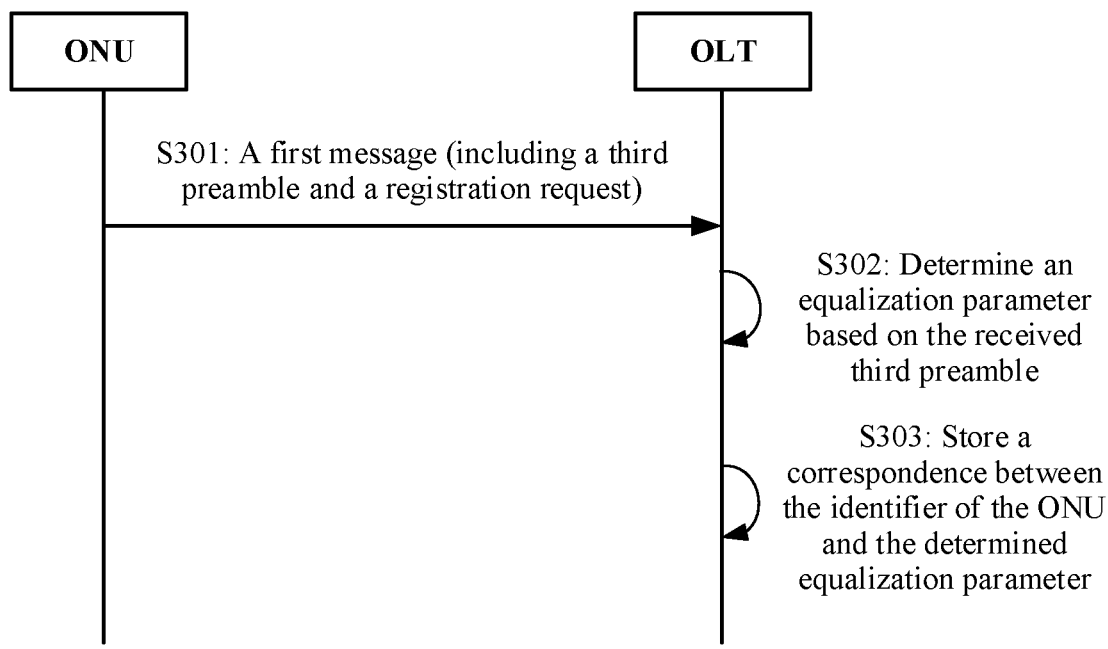
FIG. 13 is a schematic flowchart of an equalization parameter training process according to this application.

The following uses an ONU as an example to describe a process of the training in which the OLT obtains the equalization parameter. FIG. 13 is a schematic flowchart of an equalization parameter training process according to this application. As shown in the figure, the process of the training may include the following steps.

S301: The OLT receives a first message sent by the ONU, where the first message includes a third preamble and a registration request.

Further, before sending data to the OLT, the ONU needs to register with the OLT. Further, the ONU may send the first message to the OLT, where the first message includes the registration request, and the registration request is used by the ONU to register with the OLT. Herein, the registration request may be REGISTER REQ. After the ONU is registered with the OLT, the OLT may perceive that the ONU is included in the PON system and may receive the data sent by the ONU.

Optionally, the OLT may periodically open a window. During the window opening, the ONU is allowed to register with the OLT. Herein, the ONU registered with the OLT during window opening may be a newly deployed ONU in the PON system.

Optionally, a manner in which the ONU determines the third preamble includes, but is not limited to, the following two manners: (1) The ONU stores a parameter such as a code type of the third preamble and encoding frequency of the third preamble in advance, and determines the third preamble based on the prestored parameter. (2) The OLT configures, for the ONU, a parameter such as a code type and encoding frequency of the third preamble, and sends the configured parameter to the ONU. The ONU determines the third preamble based on the received parameter.

In this application, each ONU in the PON system may send the first message to the OLT using a same third preamble or different third preambles. This is not limited in this application.

In this application, the third preamble is used by the OLT to determine an equalization parameter corresponding to a transmission channel, where the transmission channel is a transmission channel between the OLT and the ONU. For the determining process, refer to related descriptions in following step S302.

Herein, the length of the first preamble in FIG. 4 and FIG. 12 is less than the length of the third preamble. That is, the length of the first preamble, in the method embodiments shown in FIG. 4 and FIG. 12, is relatively short. In this way, it may be ensured that time consumed by the OLT, based on the first preamble, in the method embodiments shown in FIG. 4 and FIG. 12, to recover the first clock, identify the identifier of the ONU, and determine the equalizing coefficient is shorter than time consumed by the OLT, based on the third preamble, to determine the equalization parameter (that is, a training process). Therefore, the fast convergence in the methods shown in FIG. 4 and FIG. 12 is implemented.

S302: The OLT determines the equalization parameter based on the received third preamble.

Further, the OLT determines the equalization parameter based on the received third preamble. Herein, the third preamble received by the OLT is transmitted through a channel (that is, the channel between the OLT and the ONU), and the third preamble carries a channel response. Therefore, the equalization parameter determined based on the third preamble corresponds to the transmission channel between the OLT and the ONU, and the equalization parameter may reflect a characteristic of the transmission channel. That is, the equalization parameter may reflect impact of the transmission channel on the transmitted data.

Herein, the equalization parameter determined by the OLT includes, but is not limited to, at least one of a tap type of the equalizer, an order of the equalizer, a tap coefficient, and the like.

In this application, the OLT may determine the equalization parameter based on the received third preamble in a plurality of manners. This is not limited in this application. Optionally, a method for calculating, by the OLT, based on the received third preamble, the tap coefficient in the equalization parameter may include a least mean square (LMS) algorithm, a recursive least squares (RLS) algorithm, a minimum mean square error (MMSE) algorithm, a least squares (LS) algorithm or a derivative algorithm of the foregoing four algorithms. This is not limited in this application.

S303: The OLT stores a correspondence between the identifier of the ONU and the determined equalization parameter.

Optionally, according to table 1, the OLT may store a correspondence between the identifier of the ONU and the determined equalization parameter. Herein, the correspondence between the identifier of the ONU unit and the determined equalization parameter may be used by the OLT to implement the data transmission method shown in FIG. 12. That is, when receiving uplink burst data from the ONU, the OLT may perform equalization on the payload part in the uplink burst data.

Through the training of the equalization parameter shown in FIG. 13, the OLT may learn, in the PON system, the impact of the channel between the OLT and each ONU on transmission data. The OLT may determine, based on the impact, an equalization parameter corresponding to each transmission channel.

Optionally, the method shown in FIG. 13 may be intermittently or periodically performed between the OLT and the ONUs that are in the PON system, to update the equalization parameter stored in the OLT.

In the methods shown in FIG. 4 and FIG. 12, when the ONU sends the uplink burst data to the OLT, the uplink burst data includes an identifier of the ONU. In the method shown in FIG. 13, after determining the equalization parameter, the OLT needs to correspond the determined equalization parameter to the identifier of the ONU. It may be learned that before the OLT communicates with an ONU, both the OLT and the ONU may obtain an identifier of the ONU. The following describes in detail two manners in which the OLT and the ONU obtain the identifier of the ONU.

(1) The identifier of the ONU is allocated by the OLT to each ONU.

Further, the OLT may allocate an identifier to each ONU registered with the OLT. Optionally, the identifier that the OLT allocated to the ONU may be an LLID, or may be another identifier. This is not limited in this application.

Optionally, after receiving the registration request sent by the ONU, the OLT may send, to the ONU, the identifier allocated to the ONU. That is, after implementation of step S301 of the method shown in FIG. 13, the method shown in FIG. 13 may further include the following step. The OLT sends the identifier allocated to the ONU to the ONU.

Optionally, in another case, the OLT may further send, to the ONU, the identifier allocated to the ONU. For example, when detecting that a new ONU accesses the PON system, the OLT allocates an identifier to the newly accessed ONU. This is not limited in this application.

(2) The ONU identifier is sent by the ONU to the OLT.

Further, in this application, if the identifier of the ONU is a specific identifier of the ONU, the ONU may obtain the identifier, and may send the identifier to the OLT.

Optionally, the specific identifier of the ONU includes, but is not limited to, the following several types: a VS SN of the ONU and a MAC address.

Optionally, the registration request sent by the ONU to the OLT may carry the identifier. That is, in step S301 of the method shown in FIG. 13, the registration request sent by the ONU to the OLT carries the identifier of the ONU.

Optionally, another message sent by the ONU to the OLT may further carry an identifier of the ONU. This is not limited in this application.

In the foregoing two manners, it can be ensured that both the OLT and the ONU obtain the identifier of the ONU in order to implement the methods shown in FIG. 4, FIG. 12, and FIG. 13.

The foregoing describes in detail the data transmission methods in this application. To better implement the method in this application, correspondingly, the following provides an apparatus in this application.

Figure 14:
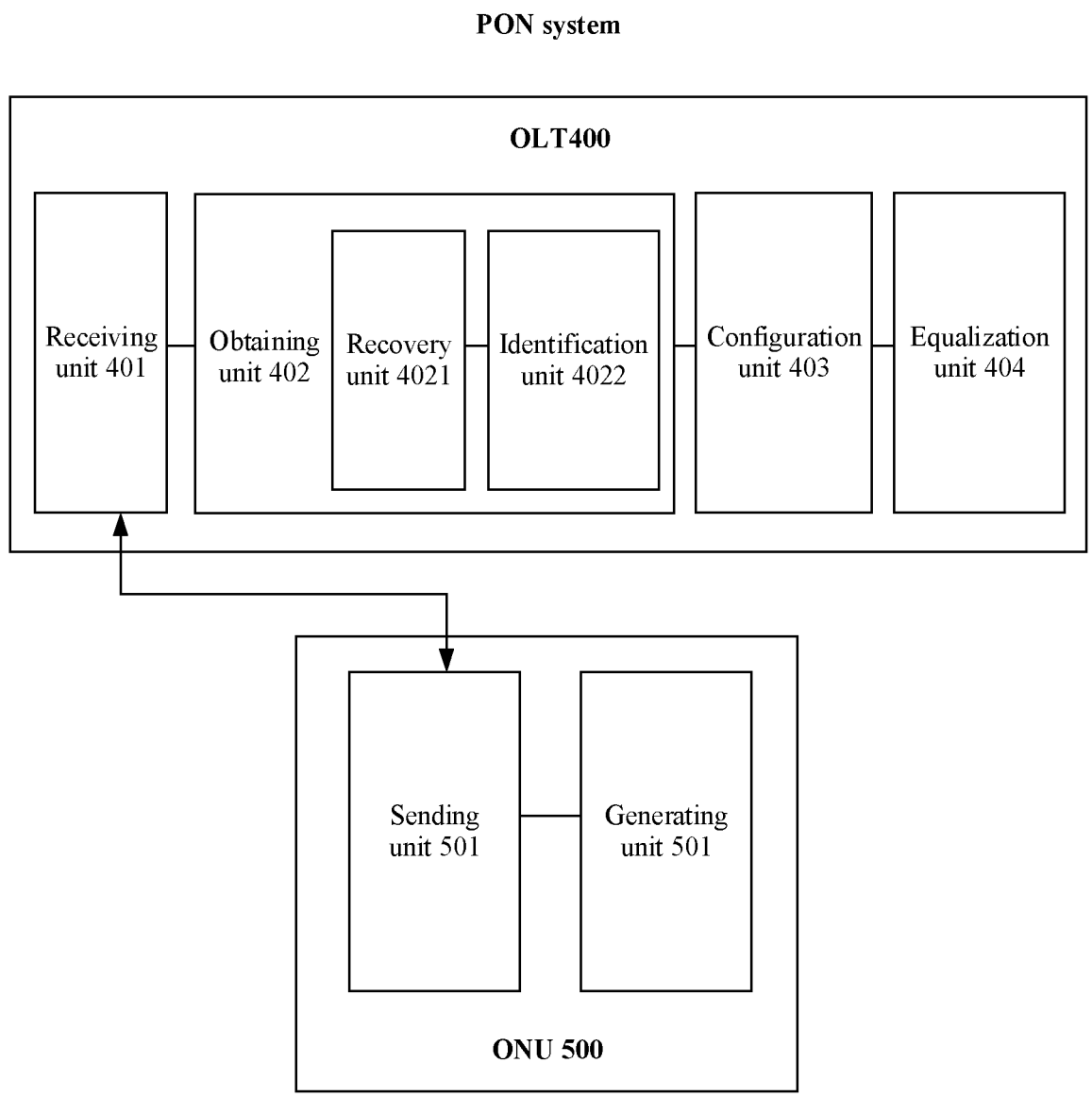
FIG. 14 is a functional block diagram of an OLT and an ONU according to this application.

FIG. 14 shows a PON system, an OLT, and an ONU according to this application. The PON system includes an OLT 400 and an ONU 500. The PON system may be the PON 100 described in FIG. 1, the OLT 400 may be the OLT 101 in the system shown in FIG. 1, and the ONU 500 may be the ONU 102 in the system shown in FIG. 1. Descriptions are separately provided below.

As shown in FIG. 14, the OLT 400 may include a receiving unit 401 and an obtaining unit 402.

The receiving unit 401 is configured to receive uplink burst data sent by an ONU. The uplink burst data includes a synchronization data block and a payload. The synchronization data block includes first synchronization data. The first synchronization data includes a first preamble and an identifier of the ONU. Also, a bandwidth occupied by frequency distribution of the first synchronization data is narrower than a bandwidth occupied by frequency distribution of the payload.

The obtaining unit 402 is configured to obtain the identifier of the ONU in the first synchronization data.

For a structure of the uplink burst data, refer to related descriptions in the method embodiment shown FIG. 4.

Herein, the receiving unit 401 may be configured to perform step S102 of the embodiment in FIG. 4, and the obtaining unit 402 may be configured to perform step S103 of the embodiment in FIG. 4. For details, refer to related descriptions. Details are not described herein again.

Optionally, the obtaining unit 402 may include a recovery unit 4021 and an identification unit 4022. The recovery unit 4021 is configured to restore a first clock based on the first preamble, and the identification unit 4022 is configured to identify, using the first clock, the identifier of the ONU in the first synchronization data.

Optionally, the OLT 400 may further include a configuration unit 403 and an equalization unit 404. The configuration unit 403 is configured to configure, based on a prestored correspondence between the identifier of the ONU and an equalization parameter, an equalization parameter corresponding to the ONU identifier. The equalization unit 404 is configured to perform equalization on the payload based on the configured equalization parameter.

Herein, the configuration unit 403 and the equalization unit 404 may be configured to perform step S204 of the embodiment in FIG. 12. For details, refer to related descriptions. Details are not described herein again.

As shown in FIG. 14, the ONU 500 may include a generating unit 501 and a sending unit 502.

The generating unit 501 is configured to generate the uplink burst data, where the uplink burst data includes a synchronization data block and a payload. The synchronization data block includes first synchronization data. The first synchronization data includes a first preamble and an identifier of the ONU. The bandwidth occupied by the frequency distribution of the first synchronization data is narrower than the bandwidth occupied by the frequency distribution of the payload.

The sending unit 502 is configured to send the uplink burst data to the OLT.

For a structure of the uplink burst data, refer to related descriptions in the method embodiment shown FIG. 4.

Herein, the generating unit 501 may be configured to perform step S101 of the embodiment in FIG. 4, and the sending unit 502 may be configured to perform S102 of the embodiment in FIG. 4. For details, refer to related descriptions. Details are not described herein again.

It may be understood that for detailed implementation of function units included in the OLT 400, refer to the foregoing embodiments. For detailed implementation of function units included in the ONU 500, refer to the foregoing embodiments.

In conclusion, during implementation of this application, in an uplink burst mode, the OLT may quickly identify which ONU or which group of ONUs the uplink burst data is from, and perform a corresponding operation based on the uplink burst data. This shortens data transmission time, and improves data transmission efficiency of a PON system.

It may be understood that this application is applicable to the PON field, and is also applicable to another point-to-point communications system. The data transmission method in this application may be applicable to another point-to-multipoint communications system in which uplink data is transmitted in a burst mode.

All or some of the foregoing embodiments may be implemented using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

The invention claimed is:

1. A method implemented by an optical line terminal (OLT), wherein the method comprises:
   receiving, from an optical network unit (ONU), uplink burst data comprising a synchronization data block and a payload, wherein the synchronization data block comprises first synchronization data and second synchronization data, wherein the first synchronization data comprises a first preamble and a first delimiter, and wherein the second synchronization data comprises a second preamble and a second delimiter;
   recovering a clock based on the synchronization data block;
   obtaining an equalization parameter based on the synchronization data block; and
   recovering the payload using the clock and the equalization parameter.

2. The method of claim 1, wherein the first preamble is of a first code type, and wherein the second preamble is of a second code type.

3. The method of claim 2, wherein before receiving the uplink burst data, the method further comprises:
   determining the first code type and the second code type; and
   sending the first code type and the second code type to the ONU.

4. The method of claim 2, wherein the first code type and the second code type are different.

5. The method of claim 1, wherein the second synchronization data and the payload have different transmission rates.

6. The method of claim 1, wherein the first synchronization data further comprises a first frequency distribution occupying a first bandwidth, wherein the payload comprises a second frequency distribution occupying a second bandwidth, and wherein the second synchronization data further comprises a third frequency distribution occupying a third bandwidth.

7. The method of claim 6, wherein the third bandwidth is wider than the first bandwidth.

8. The method of claim 6, wherein the third bandwidth is an integer multiple of the first bandwidth.

9. A method implemented by an optical network unit (ONU), wherein the method comprises:
   generating uplink burst data comprising a synchronization data block and a payload, wherein the synchronization data block comprises first synchronization data and second synchronization data, wherein the first synchronization data comprises a first preamble and a first delimiter, and wherein the second synchronization data comprises a second preamble and a second delimiter; and
   sending, to an optical line terminal (OLT), the uplink burst data.

10. The method of claim 9, wherein the first preamble is of a first code type, and wherein the second preamble is of a second code type.

11. The method of claim 10, wherein the first code type and the second code type are different.

12. The method of claim 9, wherein the second synchronization data and the payload have different transmission rates.

13. The method of claim 9, wherein the first synchronization data further comprises a first frequency distribution occupying a first bandwidth, wherein the payload comprises a second frequency distribution occupying a second bandwidth, and wherein the second synchronization data further comprises a third frequency distribution occupying a third bandwidth.

14. The method of claim 13, wherein the third bandwidth is wider than the first bandwidth.

15. The method of claim 13, wherein the third bandwidth is an integer multiple of the first bandwidth.

16. An optical line terminal (OLT) comprising:
a receiver configured to receive, from an optical network unit (ONU), uplink burst data comprising a synchronization data block and a payload, wherein the synchronization data block comprises first synchronization data and second synchronization data, wherein the first synchronization data comprises a first preamble and a first delimiter, and wherein the second synchronization data comprises a second preamble and a second delimiter; and
a processor coupled to the receiver and configured to:
recover a clock based on the synchronization data block;
obtain an equalization parameter based on the synchronization data block; and
recover the payload using the clock and the equalization parameter.

17. The OLT of claim 16, wherein the first preamble is of a first code type, and wherein the second preamble is of a second code type.

18. The OLT of claim 17, wherein before receiving the uplink burst data, the processor is further configured to:
determine the first code type and the second code type; and
send, using a transmitter, the first code type and the second code type to the ONU.

19. An optical network unit (ONU) comprising:
a processor configured to generate uplink burst data comprising a synchronization data block and a payload, wherein the synchronization data block comprises first synchronization data and second synchronization data, wherein the first synchronization data comprises a first preamble and a first delimiter, and wherein the second synchronization data comprises a second preamble and a second delimiter; and
a transmitter coupled to the processor and configured to send, to an optical line terminal (OLT), the uplink burst data.

20. The ONU of claim 19, wherein the first preamble is of a first code type, and wherein the second preamble is of a second code type.

* * * * *